(No Model.) 3 Sheets—Sheet 1.

W. I. LUDLOW.
CABLE RAILWAY SYSTEM.

No. 358,781. Patented Mar. 1, 1887.

Witnesses.
Robert Everett,
Percy B. Hills.

Inventor:
W. I. Ludlow
By James L. Norris
Atty.

(No Model.) 3 Sheets—Sheet 2.
W. I. LUDLOW.
CABLE RAILWAY SYSTEM.
No. 358,781. Patented Mar. 1, 1887.
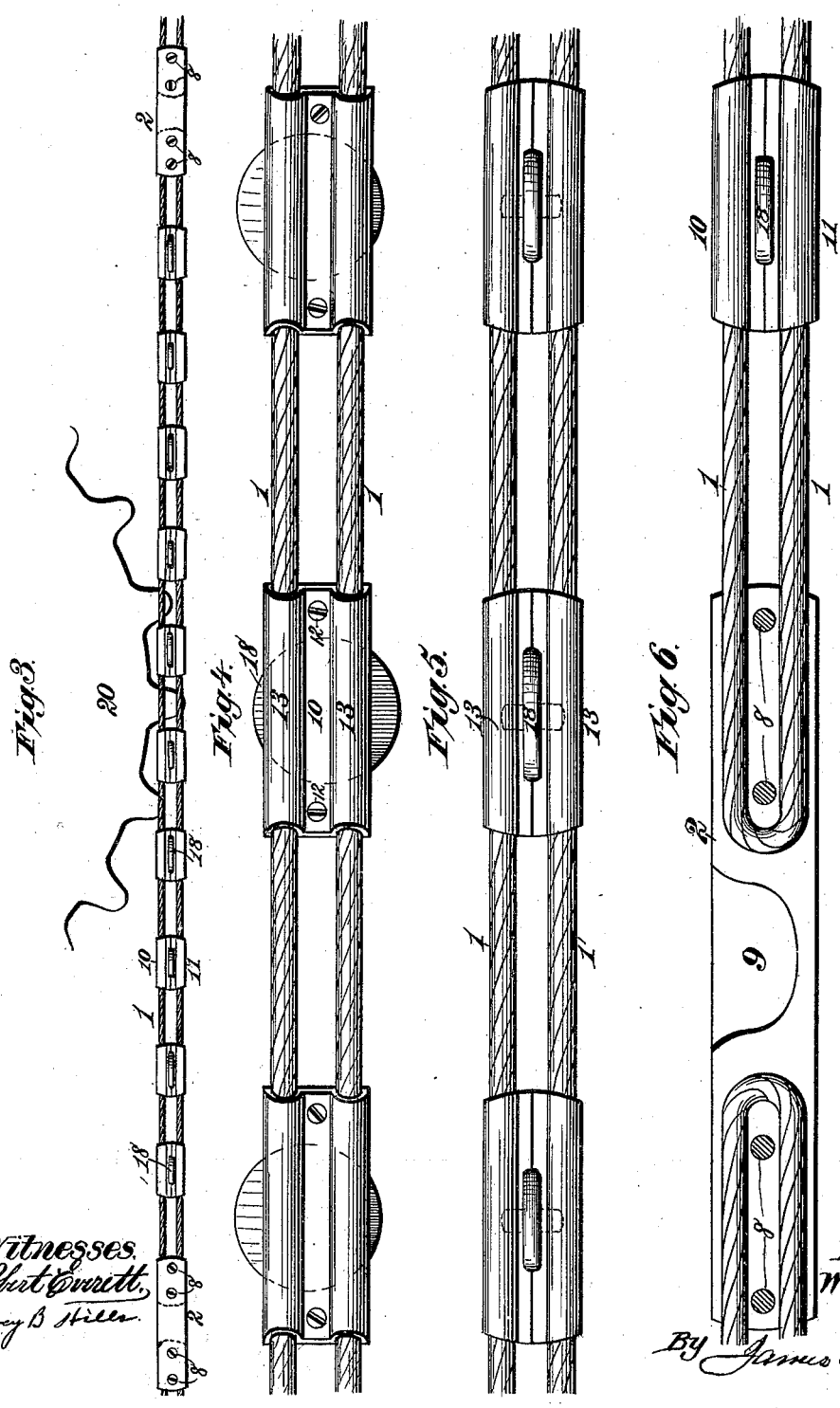
Witnesses.
Robert Emritt,
Perry B. Hiller.
Inventor.
W. I. Ludlow,
By James L. Norris
Atty.

(No Model.) 3 Sheets—Sheet 3.
W. I. LUDLOW.
CABLE RAILWAY SYSTEM.
No. 358,781. Patented Mar. 1, 1887.
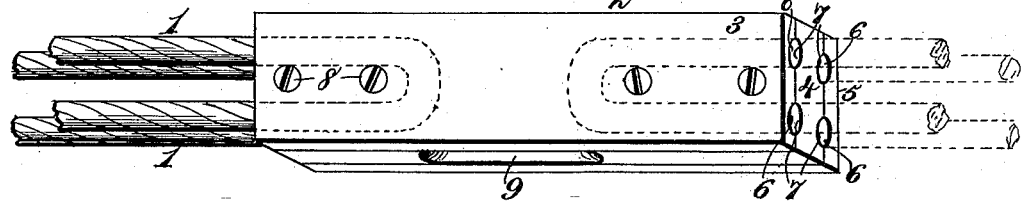
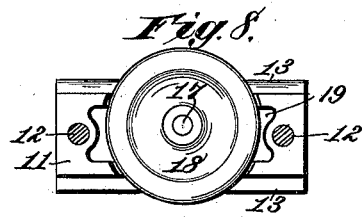
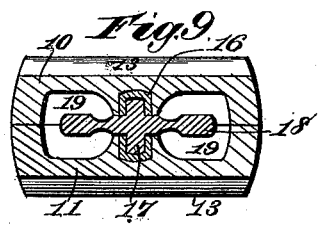
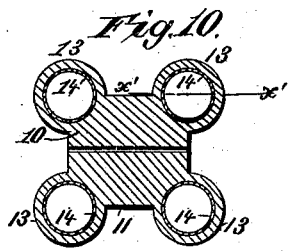
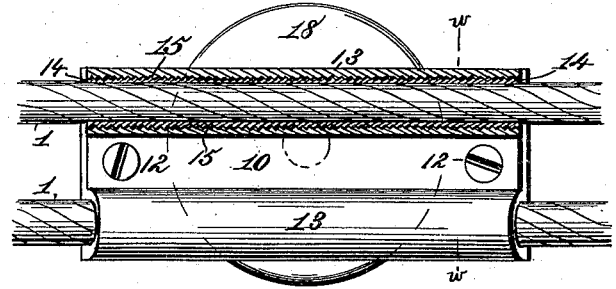
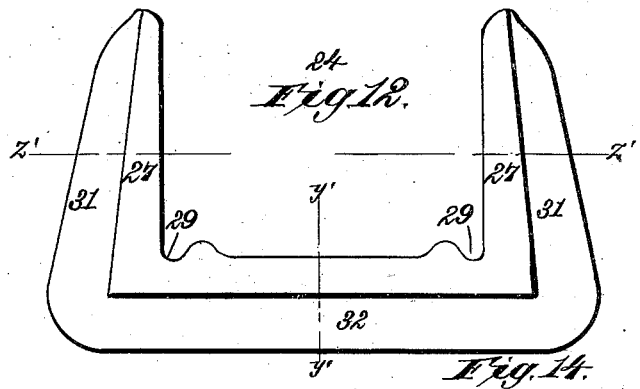
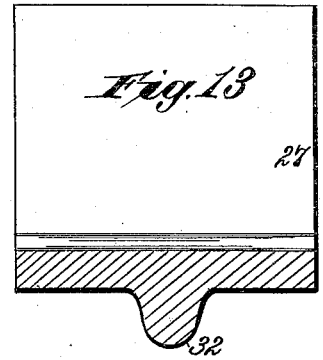
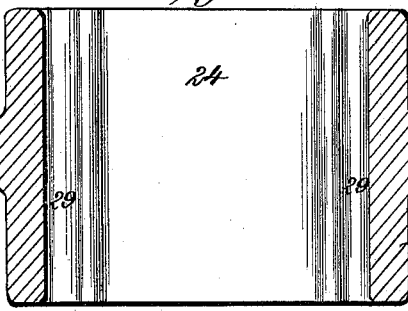
Witnesses.
Robert Everett.
Percy B. Hills.
Inventor.
W. I. Ludlow.
By James L. Norris.
Atty.
N. PETERS, Photo-Lithographer, Washington, D. C.

UNITED STATES PATENT OFFICE.

WASHINGTON I. LUDLOW, OF CLEVELAND, OHIO.

CABLE-RAILWAY SYSTEM.

SPECIFICATION forming part of Letters Patent No. 358,781, dated March 1, 1887.

Application filed November 9, 1886. Serial No. 218,405. (No model.)

*To all whom it may concern:*

Be it known that I, WASHINGTON I. LUDLOW, a citizen of the United States, residing at Cleveland, in the county of Cuyahoga and State of Ohio, have invented new and useful Improvements in Cable-Railway Systems, of which the following is a specification.

This invention has for its objects to provide a novel traction-cable and a cable-conduit for railways; to provide a novel cable which is self-supporting in the conduit therefor without the use of pulleys mounted on stationary bearings secured to the conduit; to provide a novel cable which is free from wear or abrasion by contact with bearing-surfaces; to provide a cable with such an arrangement of horizontal supporting-pulleys as to avoid the use of the ordinary pulleys mounted on stationary bearings secured to the conduit and reduce the conduit to a comparatively small size in cross-section, and to provide a sectional cable of such construction that any section, one or more, may be conveniently and quickly removed for repair and another section or sections introduced without unduly interfering with the traffic of the road. These objects I accomplish in the manner and by the means hereinafter described and claimed, reference being made to the accompanying drawings, in which—

Figure 1:
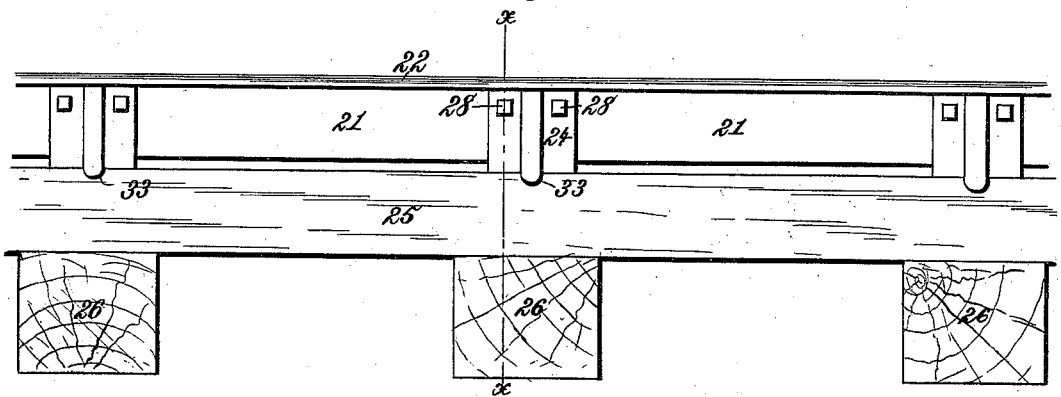
Figure 2:
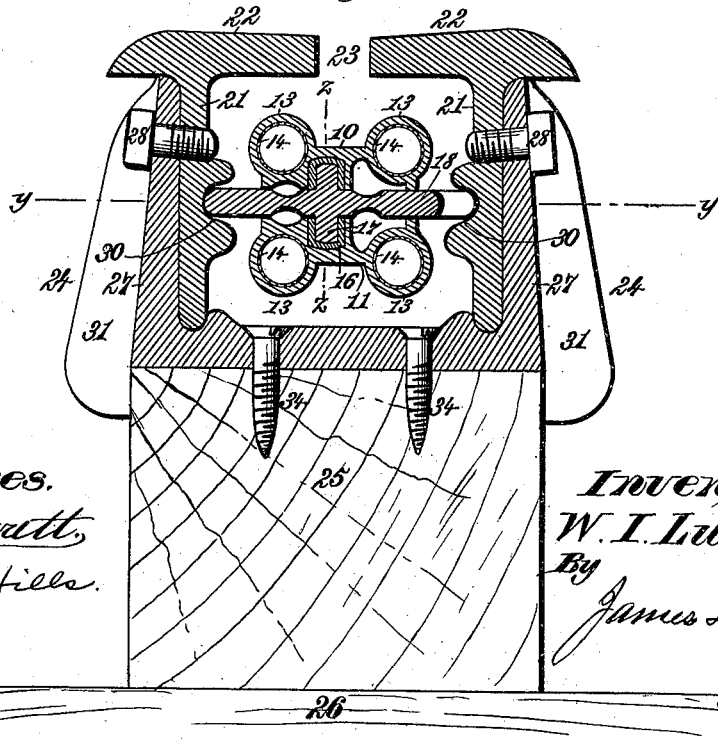

Figure 1 is a side elevation of a portion of the conduit and its supporting devices; Fig. 2, a transverse sectional view taken on the line *x x* of Fig. 1; Fig. 3, a side elevation of a portion of the cable, showing one complete link-section; Fig. 4, a top plan view of a portion of the link-sections on a larger scale; Fig. 5, a side elevation of Fig. 4; Fig. 6, a longitudinal sectional view through one of the link-couplings; Fig. 7, a perspective view of one of the link-couplings, showing the end portions of two link-sections; Fig. 8, a sectional view of a portion of one of the stops taken on the line *y y* of Fig. 2; Fig. 9, a sectional view of a portion of one of the stops taken on the line *z z* of Fig. 2; Fig. 10, a transverse sectional view of one of the stops on the line *w w*, Fig. 11; Fig. 11, a sectional view taken on the line *x' x'* of Fig. 10; Fig. 12, a detail side view of one of the conduit-chairs; Fig. 13, a section on the line *y' y'* of Fig. 12; Fig. 14, a section on the line *z' z'* of Fig. 12.

In order to enable those skilled in the art to make and use my invention, I will now describe the same in detail, referring to the drawings, where it will be seen that the cable is in sections, each composed of two links, 1, thereby making a compound cable comprising four wire-rope strands. The links are connected at their ends by clamping-couplings 2, made in three sections, 3, 4, and 5, the two outside sections having in one side two semicircular U-shaped grooves, 6, and the inside section having its opposite sides each provided with two similar grooves, 7, and all being rigidly connected by end bolts, 8, the ends of the links abutting the shoulders formed by the walls of the grooves, as shown in Fig. 7. The top edge of each coupling is provided with an opening, 9, for receiving the teeth of the cog or sprocket wheel hereinafter referred to.

The link-sections of the cable are provided with cross-stops composed of two sections, 10 and 11, connected by bolts 12, and each having two longitudinal tubular sockets, 13, through which the strands of the cable-links pass, and between the strands and the surfaces of the sockets is cast Babbitt or other soft metal, as at 14, whereby the strands are firmly joined to the cross-stops to prevent the latter from moving independently of the cable. To effect a substantial union of the soft metal with the sockets, the latter are corrugated or ribbed interiorly, as at 15, with which the soft metal engages. The cross-stops are formed with bearings 16, in which rotate the vertical journals 17 of horizontally-revolving friction-wheels 18, and interiorly the sections are provided with chambers 19, constituting oil-reservoirs around or about the journal-bearings for lubricating the faces of the wheels and their journals. The centers of the journals of the wheels in the stops are placed at one side of a longitudinal line taken centrally through the stops and the wheels, the stops being arranged so that the alternating wheels project farther from one side than from the other side of the stops, as illustrated in Fig. 4, in such manner that the wheels alternately bear against the opposite walls of the conduit hereinafter described, and each wheel only touches one wall of the conduit, having no scraping or other contact with the other wall thereof. This arrangement also places the journals of the friction-wheels between the strands comprising the cable, and provides ample room for the friction-wheels and for the play of the sprocket-wheel between the cable-strands, thus preventing the sprocket-wheel from having scraping contact with the strands.

The link-sections of the cable are, in practice, from fifty to one hundred feet long, and in constructing a section I first slide upon a wire strand a sufficient number of the cross-stops, or, rather, half-sections thereof, and then unite the ends of the strand in one of the cross-stops in any suitable manner. The friction-wheels are introduced, and the other half-sections of the stops strung on a similar wire strand are connected with the first-mentioned half-sections by the bolts or screws 12, thereby forming what I term a "four-stranded link-section." The ends of the link-sections are joined by the three-part clamping-couplings, as before explained. The cross-stops hold the strands in proper relative position, and they likewise carry the horizontal friction-wheels and are acted on by the toothed or sprocket wheel 20, as indicated in Fig. 3, such sprocket-wheel being carried by the cars and operated in any suitable manner. When the sprocket-wheel is stationary on the car and in engagement with some of the cross-stops, the travel of the cable moves the car, as will be obvious.

It will be seen that the journals of the friction-wheels are entirely inclosed within the cross-stops, thereby protecting them from dust and dirt and the wear consequent therefrom. If a wheel becomes injured or worn, it can be readily removed by separating the sections of the cross stop and another wheel introduced, while if any link-section of the cable becomes injured it can be removed and another section introduced. This is very important, in that repairs can be made without stopping the traffic of the road but for a short period of time. It is intended to keep in hand a number of the link-sections in order to avoid delay in making repairs.

By constructing the cable-sections so that each comprises four strands instead of two, I obtain greater elasticity and comparatively greater strength where the strands are joined. The conduit for the cable is composed of two similar vertical steel or other metal T-shaped rails, 21, having the heads 22 extending toward each other to provide the slot 23, through which the sprocket-wheel 20 passes. These T-shaped rails rest upon and are vertically supported by chairs 24, resting on a longitudinal stringer, 25, placed centrally between the rails of the track, said stringer being supported by cross-ties 26. The chairs are each composed of a base-plate having at each end an upright arm, 27, with flat inner faces, against which the rails 21 bear, and to which they are secured by screw-bolts 28, and the base-plate of the chair at each end, directly at the point where the arm 27 begins to rise, is provided with a groove, 29, in which the bases of the rails 21 rest, to prevent their lateral movement at these points. The rails are provided on their inner faces with longitudinal grooves or trackways, 30, in which travel the horizontal friction-wheels on the cross-stops of the cable. The upper and lower walls formed by the grooves 30 sustain the friction-wheels against vertical movements, and accordingly support the cable in a perfect manner. As the friction-wheels revolve horizontally, the cable can readily pass around curves in the conduit without providing at such points the usual pulleys mounted on bearings secured to the walls of the conduit.

The chairs are strengthened by forming their vertical arms with external ribs or webs, 31, while the bases of the chairs are strengthened by ribs 32, resting in transverse recesses 33, formed in the top surface of the stringer 25, and said chairs are firmly fixed in position by screws or bolts 34. passing into the stringer through the chair-bases.

The necessary motion is imparted to the cable in any suitable manner—as, for example, by a revolving bull-wheel having sockets with which the cross-stops engage, or by the employment of several sets of revolving sprocket-wheels meshing with the cable and moving in unison.

By my invention I protect the cable-strands from all frictional contact with the conduit and the sprocket-wheel on the car, and therefore avoid wear and abrasion, while simple and convenient means are provided for repairing the cable and its adjuncts, and, further, the size of the conduit is greatly reduced in cross-section as compared with the cable-conduits now in use, thereby decreasing the cost of constructing a cable road. If desired, the clamping-couplings of the link-sections can be provided with horizontally-revolving friction-wheels, the same as the cross-stops.

Having thus described my invention, what I claim is—

1. A railway-cable comprising four strands and cross-stops, each having longitudinal tubular sockets through which the strands pass, and whereby the latter are held in proper relative position, substantially as described.

2. A railway-cable comprising four strands and cross-stops, each composed of two sections detachably connected, each section provided with two longitudinal tubular sockets through which the strands pass and in which they are rigidly fastened, substantially as described.

3. A railway-cable comprising four strands and cross-stops, each having longitudinal tubular sockets through which the strands pass and wherein they are rigidly held by a filling of soft metal cast into the sockets between their surfaces and the cable-strands, substantially as described.

4. A railway-cable comprising strands and cross-stops, each having longitudinal sockets interiorly corrugated or ribbed through which the strands pass and wherein they are rigidly held by a filling of soft metal engaging the surfaces of the strands and the corrugations or ribs in the sockets, substantially as described.

5. The combination, with a railway-cable, of cross-stops rigidly connected with the strands and each provided with a friction-wheel having its axis arranged at one side of a longitudinal line taken centrally through the cross-stop, substantially as described.

6. The combination, with a cable-conduit having its vertical sides longitudinally grooved, of a cable composed of detachably-connected links of wire rope, and cross-stops rigidly connected to the members comprising the links, and carrying horizontally-rotating friction-wheels traveling within the said grooves of the conduit, substantially as described.

7. The combination, with a railway-cable and a cable-conduit having its sides provided with trackways, of cross-stops rigidly connected with the cable and each having a horizontally-revolving friction-wheel, the axis of which is at one side of a longitudinal line taken centrally through the stop, the said wheels being arranged so that they bear alternately against the opposite side walls of the conduit, substantially as described.

8. In a cable-railway system, a traction-cable composed of a series of detachably-connected links of wire rope, substantially as described.

9. A traction-cable for railways, consisting of a series of detachably-connected links, and cross-stops rigidly secured to and between the members comprising the links, substantially as described.

10. A traction-cable for railways, consisting of a series of detachably-connected links of wire rope, each link having a series of cross-stops rigidly secured to the members composing the links, substantially as described.

11. A traction-cable for railways, consisting of a series of detachably-connected links of wire rope, and cross-stops having tubular sockets through which the members comprising the links pass and in which they are rigidly secured, substantially as described.

12. A traction-cable for railways, consisting of a series of links of wire rope, couplings detachably connecting the ends of the links, and cross-stops rigidly connected with the members composing the links, substantially as described.

13. A traction-cable for railways, consisting of detachably-connected link-sections and cross stops rigidly secured to the strands of the links, and provided with friction-wheels revolving in a horizontal plane in the cross-stops, substantially as described.

14. A traction-cable for railways, composed of sections each comprising two separate links placed parallel to each other, and connecting-couplings at the ends of the links, substantially as described.

15. A traction-cable for railways, composed of sections each comprising two separate links, couplings connecting the ends of the links, and cross-stops rigidly secured to the strands of the links, substantially as described.

16. A traction-cable for railways, composed of sections each comprising two separate links, sectional couplings detachably connecting such link-sections, and cross-stops rigidly connected to the strands of the links, and provided with friction-wheels journaled therein, substantially as described.

17. A traction-cable for railways, composed of sections each comprising two separate links, end couplings for the link-sections, and cross-stops provided with tubular sockets through which the strands of the links pass and in which they are rigidly secured, substantially as described.

18. A traction-cable for railways, composed of sections each comprising two separate links, end couplings for the link-sections, sectional cross-stops having tubular sockets in which the strands of the links are secured, and a friction-wheel journaled between the sections of each stop, substantially as described.

19. The combination, with a cable for railways, of a cross-stop secured thereto and made in sections containing a lubricant-chamber around or about the bearing for the journal of a friction-wheel, substantially as described.

20. The combination, with a traction-cable, of cross-stops secured thereto and made in sections containing a lubricant-chamber and a journal-bearing, and a friction-wheel having its journal in said bearing and rotating through the lubricating-chamber, substantially as described.

21. The combination, with a railway-cable comprising strands placed parallel, or substantially so, of friction-wheels having their journals located between the strands, substantially as described.

22. The combination, with a railway-cable comprising strands placed parallel, or substantially so, of horizontally-revolving friction-wheels having vertical journals located between the strands, substantially as described.

23. The combination, with a railway-cable comprising strands placed parallel, or substantially so, of wheel-supports rigidly connected with the strands, and friction-wheels having their journals located in bearings in the said supports between the cable-strands, substantially as described.

24. A compound traction-cable composed of a series of strands connected by cross-stops having friction-wheels journaled thereupon, with the journals of the wheels located alternately at opposite sides of a longitudinal central line through the cable, substantially as described.

25. The combination of the chairs having end vertical arms and the vertical rails bolted to the said arms and provided with longitudinal trackways with a cable having horizontally-revolving friction-wheels traveling in the said trackways, substantially as described.

In testimony whereof I have affixed my signature in presence of two witnesses.

WASHINGTON I. LUDLOW.

Witnesses:
J. A. RUTHERFORD,
GEORGE W. REA.